(12) United States Patent
Dietrich et al.

(10) Patent No.: US 9,334,752 B2
(45) Date of Patent: May 10, 2016

(54) SYSTEM AND DEVICE FOR OVER-SPEED PROTECTION OF A TURBO-MACHINE

(75) Inventors: Brent Allan Dietrich, Fort Collins, CO (US); Ricardo Stack, Guilderland, NY (US); John Kirk Foundoulis, Fort Collins, CO (US); Steven Jackson Foss, Loveland, CO (US)

(73) Assignee: General Electric Company, Schenectady, NY (US)

( * ) Notice: Subject to any disclaimer, the term of this patent is extended or adjusted under 35 U.S.C. 154(b) by 1014 days.

(21) Appl. No.: 13/416,703

(22) Filed: Mar. 9, 2012

(65) Prior Publication Data

US 2013/0233423 A1 Sep. 12, 2013

(51) Int. Cl.
*F01D 21/02* (2006.01)
*F01D 21/18* (2006.01)

(52) U.S. Cl.
CPC .............. *F01D 21/02* (2013.01); *F01D 21/18* (2013.01); *Y10T 137/86606* (2015.04)

(58) Field of Classification Search
CPC ......... F01D 21/02; F01D 21/18; F01D 21/16; F16K 31/12; F16K 31/122; F16K 31/1221; F16K 31/1223; F16K 31/1245
USPC ............ 251/30.01, 30.02, 26; 137/487.5, 485
See application file for complete search history.

(56) References Cited

U.S. PATENT DOCUMENTS

| | | | | |
|---|---|---|---|---|
| 3,981,478 A * | 9/1976 | Lundsgart | ...................... | 251/29 |
| 5,280,807 A * | 1/1994 | Frey et al. | ................ | 137/596.15 |
| 6,584,999 B2 * | 7/2003 | Inayama et al. | ........... | 137/487.5 |
| 7,194,865 B2 | 3/2007 | Drob | | |
| 7,814,750 B2 * | 10/2010 | Deeg et al. | ...................... | 60/407 |
| 8,833,391 B2 * | 9/2014 | Andersson | ............... | 137/596.14 |

* cited by examiner

*Primary Examiner* — John K Fristoe, Jr.
*Assistant Examiner* — Andrew J Rost
(74) *Attorney, Agent, or Firm* — Barclay Damon, LLP

(57) ABSTRACT

This disclosure describes embodiments of a system and device to prevent damage that can occur during an over-speed condition in a turbo-machine. The embodiment includes a fluid circuit with a header, which couples to the turbo-machine, and a hydraulic circuit through which fluid can evacuate the header to a drain. The hydraulic circuit includes a trip header manifold with a pilot element in flow connection with a drain valve element that has an actuator to regulate the flow of fluid from the header. In one example, the pilot element uses solenoid valves to change the pressure of a fluid in the drain valve element and, in particular, maintains the actuator in a first position to prevent fluid to evacuate during normal operating conditions at the turbo-machine. When the over-speed condition occurs the actuator moves to a second position to place the header in flow connection with the drain.

5 Claims, 9 Drawing Sheets

SYSTEM AND DEVICE FOR OVER-SPEED PROTECTION OF A TURBO-MACHINE

BACKGROUND OF THE INVENTION

The subject matter disclosed herein relates to turbo-machines (e.g., gas and/or steam turbines) and, in particular, to systems and devices that prevent damage to turbo-machines.

Turbines and other turbo-machines may operate under conditions that cause damage. For example, rapid generator unloading can cause acceleration of the turbine shaft or what is known as an over-speed condition in the turbo-machine. In addition to a speed control system, designs for turbo-machines often have a separate protection system to address over-speed conditions. The speed control system has features useful to startup and maintain the turbo-machine in continuous operation. However, when the speed control system does not operate properly or when events or conditions occur outside the ability of the speed control system to control, the over-speed protection system is in place to reduce the likelihood that damage will occur.

Over-speed protection systems for turbo-machines often utilize mechanical devices. Examples of the mechanical devices include spring-loaded eccentric bolts (installed inside the turbine shaft) and spring-loaded pistons (installed outside the turbine shaft). During operation of the turbo-machine, high rotational speed conditions generate centrifugal forces that drive these mechanical devices to strike a lever. This action closes or "trips" a valve or other component, thereby shutting the turbo-machine down. However, although these mechanical devices may provide an effective mechanism for over-speed protection, friction and wear can reduce the reliability of these mechanical devices over time.

Other over-speed protection systems may integrate electronic devices as part of the scheme. In one example, the over-speed protection system includes a solenoid valve. Under normal turbo-machine operation and loading, the solenoid valve is energized to restrain a spring-loaded rod or valve. If the turbo-machine experiences high or rapidly accelerating rotational speed, the solenoid valve is de-energized by the electronic over-speed detection system. This action shuts down the turbo-machine. One problem with these electronic devices is the high solenoid current that is required to compress the spring for resetting the rod or valve. This feature decreases the reliability of the over-speed protection system using these electronic devices.

The discussion above is merely provided for general background information and is not intended to be used as an aid in determining the scope of the claimed subject matter.

BRIEF DESCRIPTION OF THE INVENTION

This disclosure describes embodiments of a system and a device that protects turbo-machines from damage that can occur during over-speed conditions. An advantage that the practice of some embodiments of the system and device is to forgo use of mechanical and electro-mechanical devices that engage moving components of the turbo-machine. In lieu of these components, these embodiments can rapidly evacuate (or "dump") fluid from a "trip" header to a drain. The trip header couples with the turbo-machine, so that the rapid evacuation of fluid deactivates or "trips" the turbo-machine before catastrophic damage can occur.

The proposed embodiments offer other advantages, including operation that is fully and safely maintainable down to the lowest level component while the turbo-machine is in operation; high flow volume design for fast turbine trip protection; redundant component design to prevent trip due to single component failures, to allow for full online testing and replacement of components, and to provide full instrumentation for detection of latent component failures, and to achieve high operational reliability while still providing high safety integrity level for turbo-machine and human life protection; component and system design to facilitate "bumpless" system testing and return to service after maintenance; material and component selection and construction resistant to temperature extremes and corrosive atmospheres and to provide a design for use in explosive atmosphere environments without risk of igniting the same; and high expected mean time between failure design of all components.

In this connection, the disclosure describes, in one embodiment, a device for preventing damage in a turbo-machine. The device comprises a pilot element with a first pilot valve and a second pilot valve in flow connection with the first pilot valve. The device also has a drain valve element in flow connection with the pilot element, the drain valve element having an actuator with a first position to prevent fluid flow through the drain valve element and a second position to permit fluid flow through the drain valve element. In one example, the drain valve element changes from the first position to the second position in response to fluid flow across both of the first pilot valve and the second pilot valve.

The disclosure also describes, in another embodiment, a trip manifold device for evacuating fluid from a header coupled to a turbo-machine. The trip manifold device comprises a pilot housing a pair of solenoid valves coupled to the pilot housing and a drain housing in flow connection with the pilot housing. The drain housing includes an actuator with a first position to prevent fluid flow from a first inlet/outlet of the drain housing to a second inlet/outlet of the drain housing and a second position to permit fluid flow from the first inlet/outlet to the second inlet outlet. In one example, the poppet valve changes from the first position to the second position in response to fluid flow across both of the solenoid valves.

In yet another embodiment, the disclosure describes a protection system for over-speed protection in a turbo-machine. The system comprises a fluid circuit with a header, a drain, and a hydraulic circuit coupling the header to the drain. The hydraulic circuit has a trip manifold device with a first state that prevents fluid to flow from a first inlet/outlet of the trip manifold device to a second inlet/outlet of the trip manifold device and a second state that permits fluid to flow from the first inlet outlet to the second inlet/outlet. In one example, the second state places the header in flow connection with the drain to permit fluid in the header to flow to the drain.

This brief description of the invention is intended only to provide a brief overview of the subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

This disclosure describes embodiments of systems and devices that protect an asset during operating conditions that can cause damage. In one embodiment, the systems and devices protect a turbo-machine (e.g., a gas and/or steam turbine) from a so-called over-speed condition. These embodiments replace conventional protection schemes, e.g., those that use mechanical and electrical mechanisms to physically engage components (e.g., turbine shaft) of the turbo-machine. Rather, in one embodiment, the system dumps fluid from a header and, as a result, shuts down (or "trips") the asset before damage can occur. This embodiment may utilize a pair of hydraulic circuits that couple the header to one or more drains to allow fluid to evacuate the system. This configuration of components offers redundant protection for the asset, as each of the hydraulic circuits are capable of tripping the asset independent from one another. Moreover, embodiments of the present disclosure also (1) permit maintenance and testing of the hydraulic circuits to occur without the need to shut-down or disturb operation of the asset; (2) reduce pressure drop on return to service after maintenance is complete; (3) displace large volumes of fluid to meet response time for trip protection (e.g., 500 milliseconds or less); (4) provide hydraulic circuits that are both self-filling and pressurizing, (5) reduce potential for nuisance trips due to operator error and/or plugs in fluid elements (e.g., orifices) as well as provide other advantages and benefits that will become apparent from the details in the discussion that follows below.

Figure 1:
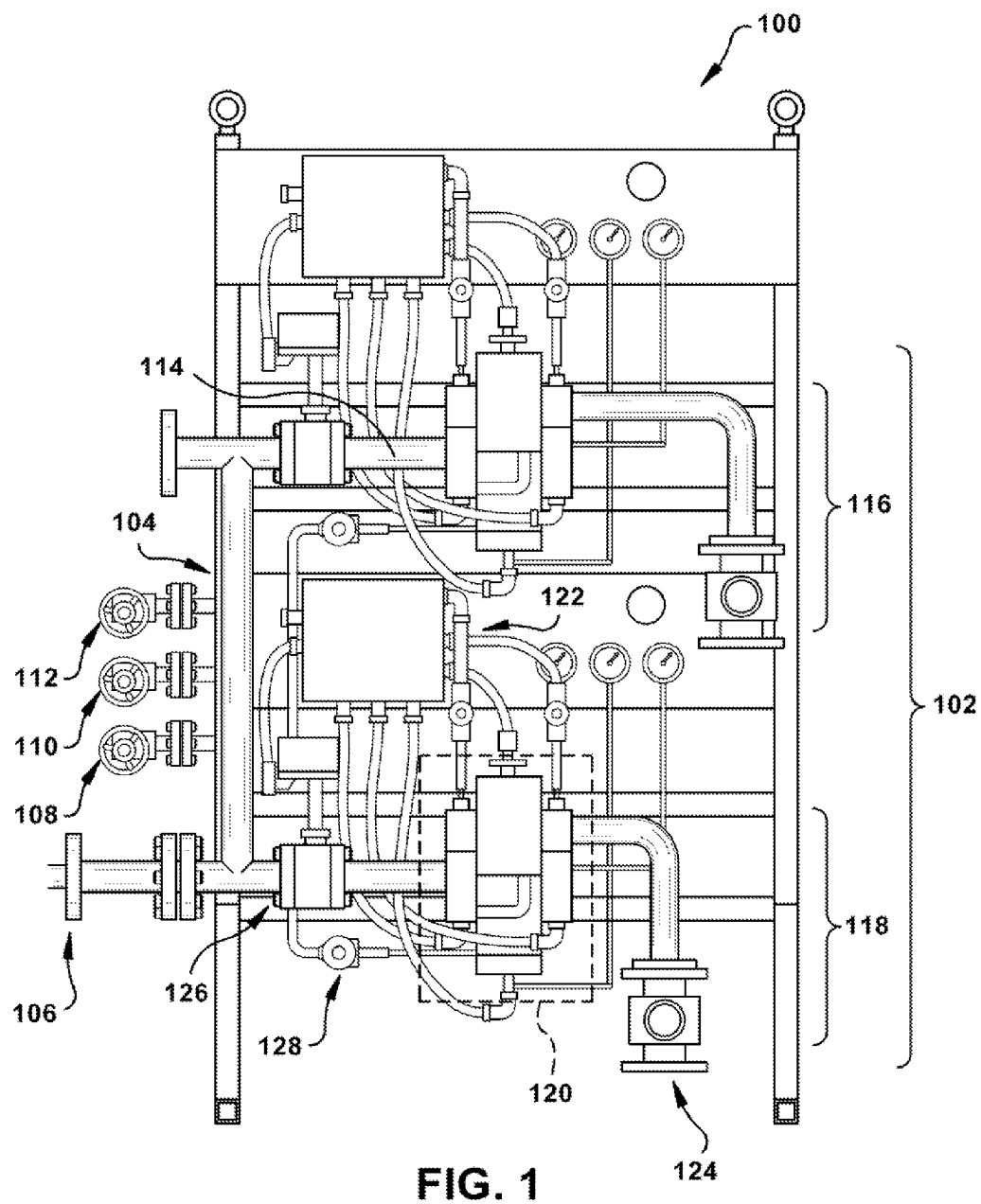
FIG. 1 depicts a front view of an exemplary protection system.

FIG. 1 illustrates an exemplary protection system 100 that couples, e.g., with a turbo-machine (not shown). The protection system 100 includes a fluid circuit 102 with a header 104 and a supply port 106 that receives a fluid (e.g., hydraulic oil). The header 104 has one or more taps (e.g., a first tap 108, a second tap 110, and a third tap 112) that couple with control and monitoring devices that operate the turbo-machine (and/or parts thereof). The fluid circuit 102 has one or more conduits 114 that direct the fluid to a pair of hydraulic circuits (e.g., a first hydraulic circuit 116 and a second hydraulic circuit 118). The hydraulic circuits 116, 118 include a trip manifold device 120 with electrical devices that operate elements (e.g., valves) on the trip manifold device 120. A junction box 122 couples with the trip manifold device 120. The hydraulic circuits 116, 118 also include one or more valves (e.g., a first valve 126 and a second valve 128) to change the flow of the fluid to the trip manifold device 120.

During operation, the trip manifold device 120 prevents and/or permits fluid to exit the hydraulic circuits 116, 118 to a drain 124. In one example, actuation of either of the valves 126, 128 isolates the corresponding hydraulic circuits 116, 118 from the header 104. Once isolated, the trip manifold device 120 and/or other components of the hydraulic circuit 116, 118 can undergo maintenance and/or testing to verify proper operation. However, by maintaining at least one of the hydraulic circuits 116, 118 in flow connection with the header 104, the protection system 100 maintains trip protection without interrupting operation of the turbo-machine coupled to the header 104.

Figure 2:
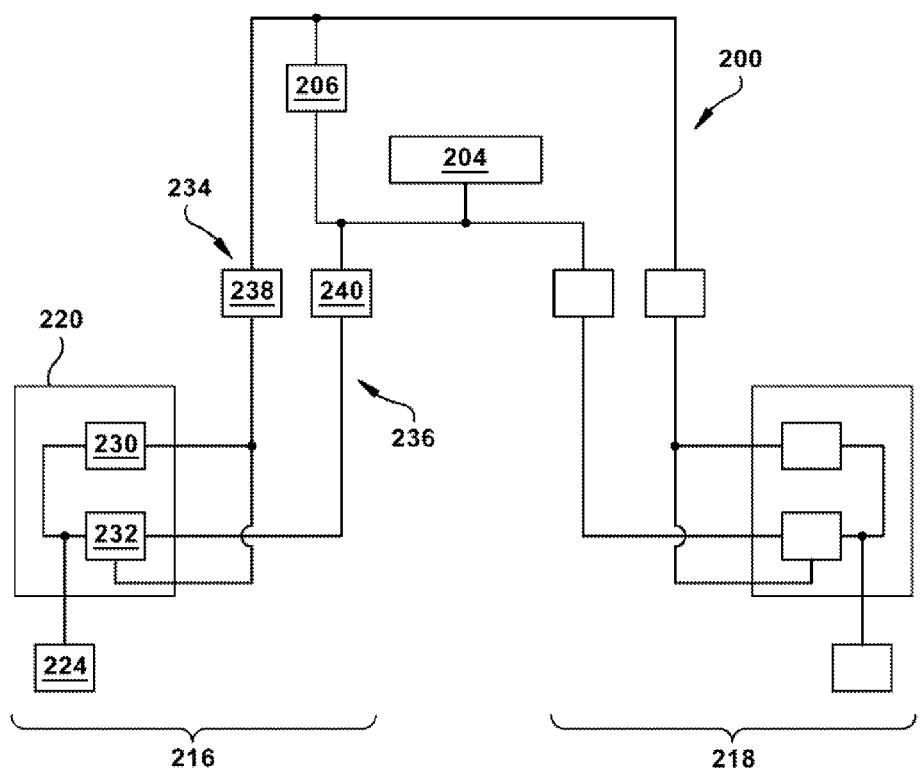
FIG. 2 depicts a schematic view of another exemplary protection system.

FIG. 2 depicts a schematic diagram of another exemplary protection system 200 that can prevent damage, e.g., damage in a turbine due to over-speed events. The protection system 200 includes a header 204 and a supply port 206. The header 204 couples with a first hydraulic circuit 216 and a second hydraulic circuit 218, each of which has a trip manifold device 220 and a drain 224. The trip manifold device 220 has a pilot element 230 and a drain valve element 232 in flow connection with each other and with the drain 224. In one embodiment, the hydraulic circuits 216, 218 can include a pilot fluid circuit 234 and a main fluid header 236 that couple with the trip manifold device 220. The main fluid header 236 directs fluid to the drain valve element 232. The pilot fluid circuit 234 directs fluid to the pilot element 230 and the drain valve element 232. A pilot isolation valve 238 and a main isolation value 240 control the flow of fluid to the circuits of the trip manifold device 220.

The protection system 200 utilizes the fluid (e.g., hydraulic oil) that flows through the header 204 and to the turbo-machine to effectuate operation of the over-speed protection. In one implementation operation of the pilot element 230 and the drain valve element 232 change the state of the trip manifold device 220, e.g., from a first state that prevents fluid to flow through the trip manifold device 220 to the drain 224 to a second state that permits fluid to flow through the trip manifold device 220 and out to the drain 224. The change from the first state to the second state causes rapid evacuation of fluid from the header 204, thereby tripping the turbo-machine before damage can occur, e.g., due to the over-speed event.

Figure 3:
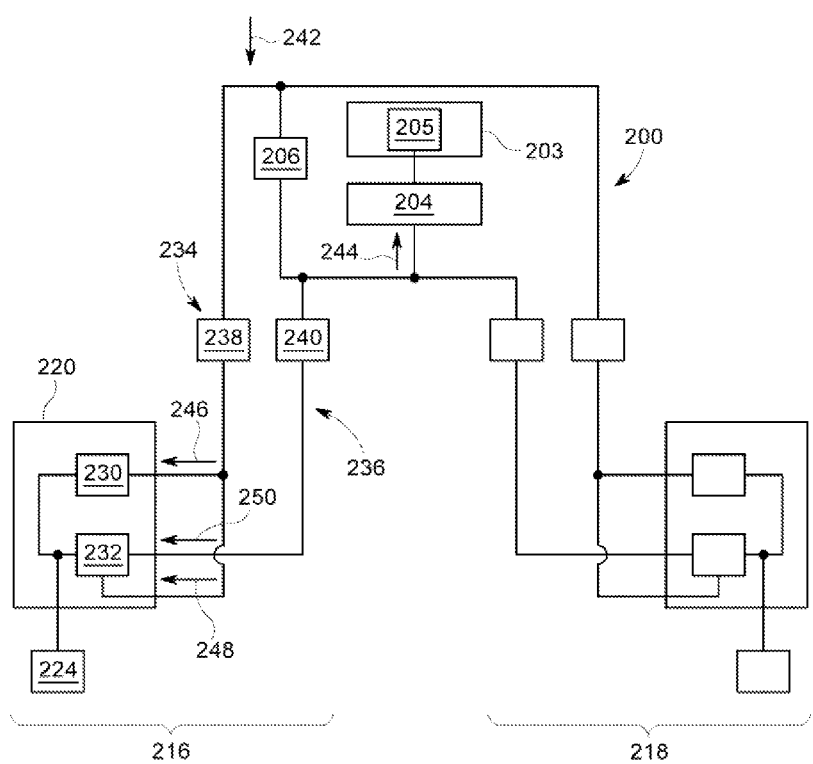
FIG. 3 depicts a flow pattern for the exemplary protection system of FIG. 2 during normal operating conditions of a turbo-machine.
Figure 4:
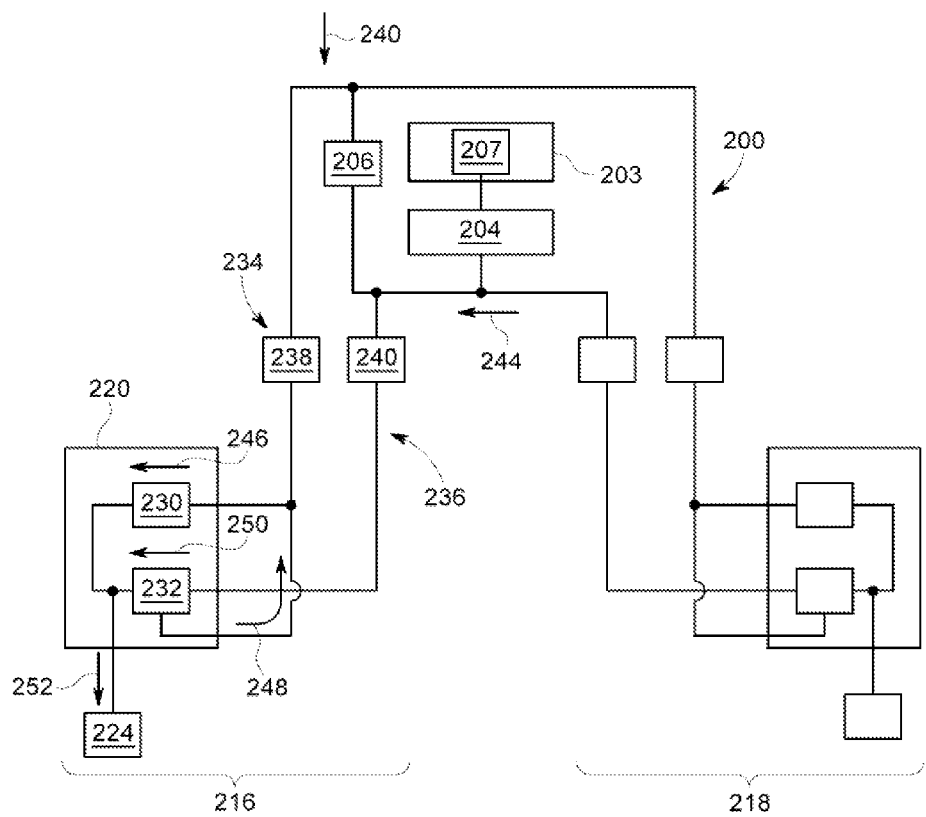
FIG. 4 depicts a flow pattern for the exemplary protection system of FIG. 2 during an over-speed condition of the turbo-machine.

FIGS. 3 and 4 illustrate the fluid flow pattern with arrows to depict the general direction of fluid flow that occurs when the trip manifold device 220 changes from the first state to the second state, e.g., in response to over-speed conditions at the turbo-machine. In FIG. 3, the trip manifold device 220 is in the first state. The fluid flow pattern is exemplary of turbo-machines operating under normal running conditions. A supply fluid 242 enters the supply port 206. The supply fluid 242 circulates to the header 204 (e.g., as a header supply 244) and to the trip manifold device 220 as a pilot supply (e.g., a first pilot supply 246 and a second pilot supply 248) and a main supply 250. When the turbo-machine operates normally, i.e., where no over-speed condition is detected, the drain valve element 234 prevents flow of the main supply 250 through the trip manifold device 220 to the drain 224. This feature maintains pressure of the header supply 244 at the header 204 and, in effect, causes the header supply 244 to disperse to the turbo-machine and/or to other components secured thereto.

As shown in FIG. 4, the trip manifold device 220 enters the second state in response to over-speed conditions. The second state permits the main supply 250 to flow through the trip manifold device 220 and, in one example, through the valve device 232 to the drain 224, e.g., as a drain supply 252. The change in the state of the trip manifold device 220 may occur in response to a signal (e.g., an electrical signal) that indicates that turbo-machine 203 has, or is, about to enter the over-speed condition and/or other conditions that require the turbo-machine to be shut down (or "tripped"). The sensor 207 can originate from a speed sensor (e.g., a magnetic pick up (MPU)) disposed on and/or near a component (e.g., a shaft) of the turbo machine. In one example, the pilot element 230 includes one or more elements that actuate in response to the signal, which allows the first pilot supply 246 to flow across the pilot element 230 and on to the drain 224. The flow of the first pilot supply 246 reduces the pressure of the second pilot supply 248 at the drain valve element 232. In one example, the drain valve element 232 includes elements that actuate in response to the reduced pressure of the second pilot supply 248 to allow the main supply 250 to flow through the drain valve element 232 and on to the drain 224. The flow of the main supply 250 rapidly reduces the pressure of the header supply 244 at the header 204 and, more particularly, drains the header supply 244 (as generally indicated by the change in direction of the arrow of the header supply 244). The reduction in pressure and change in flow of the header supply 244 trips the turbo-machine.

Figure 5:
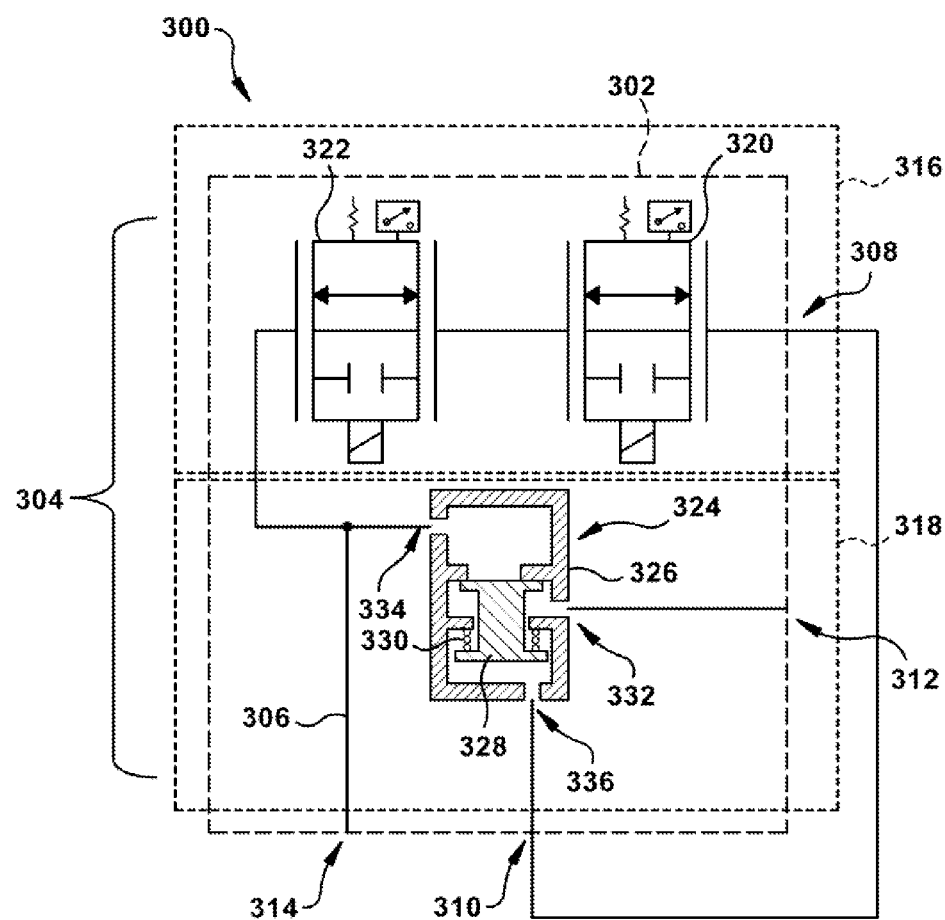
FIG. 5 depicts a schematic view of an exemplary trip manifold device for use in the protection system of FIGS. 1, 2, 3, and 4.
Figure 8:
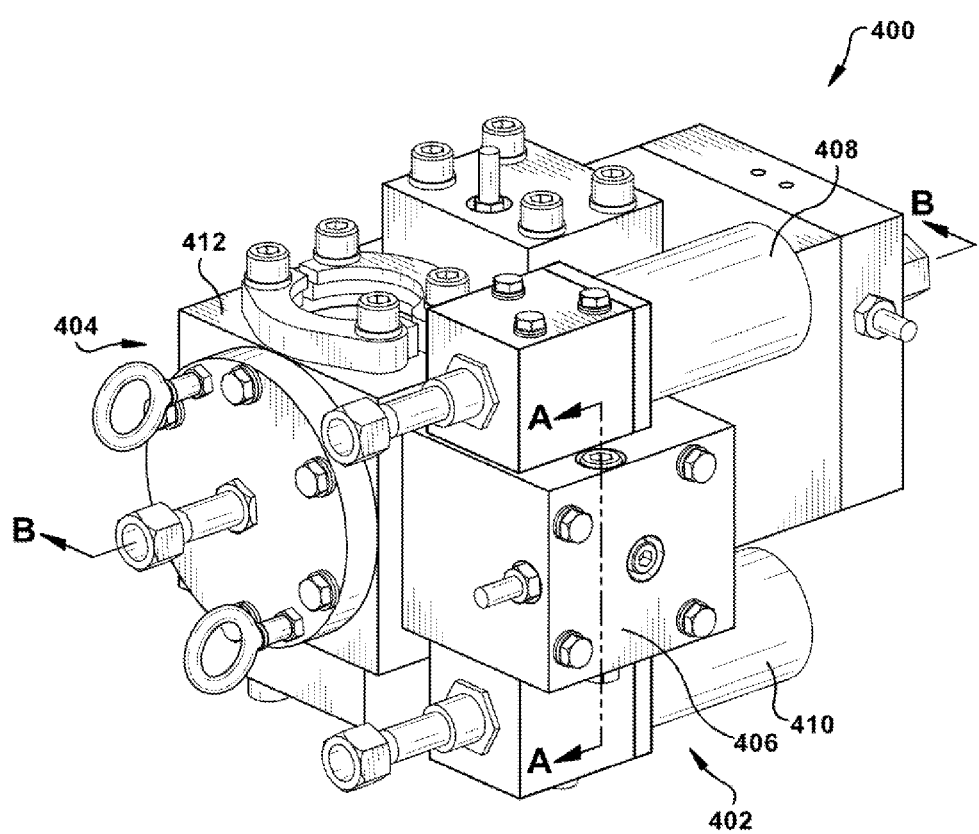
FIG. 8 depicts a perspective view of another exemplary trip device for use in the protection system of FIGS. 1, 2, 3, 4.
Figure 9:
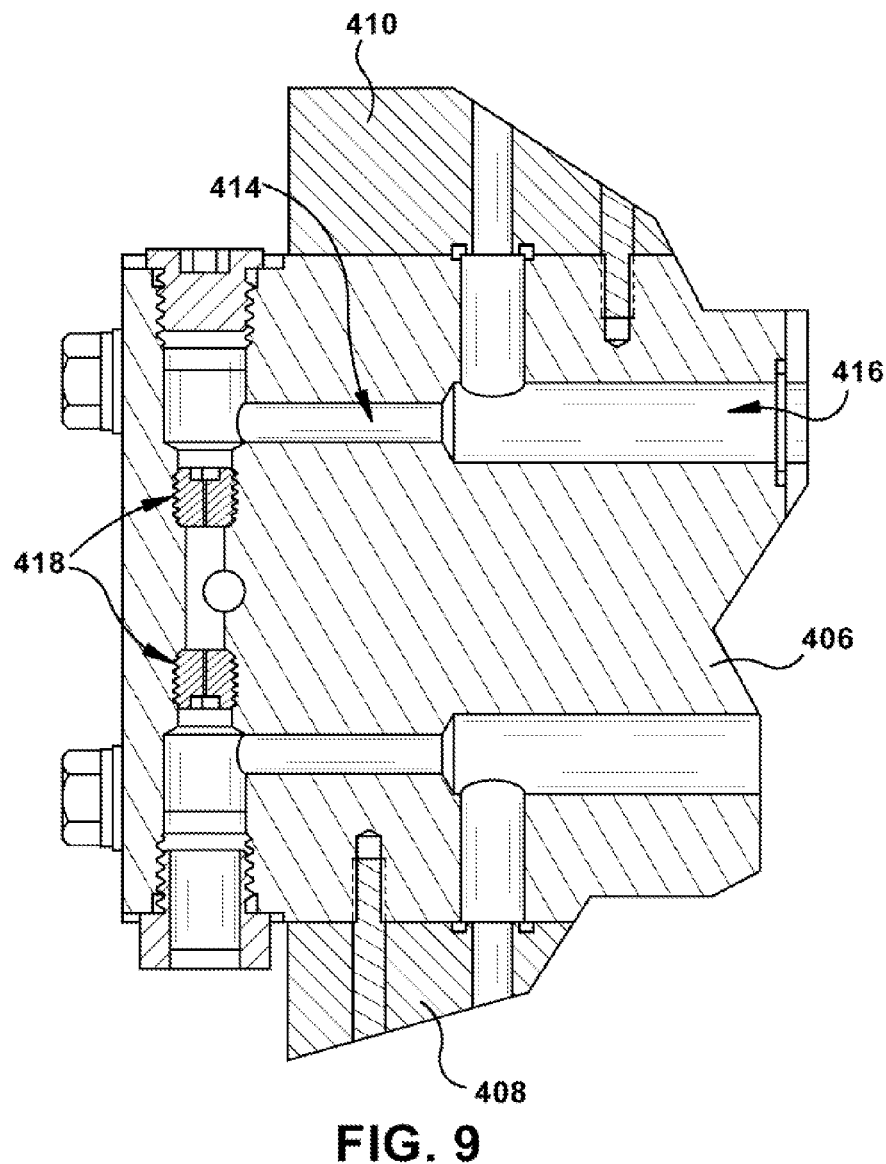
FIG. 9 depicts a cross-section of the exemplary trip manifold device along a line A-A of FIG. 8.
Figure 10:
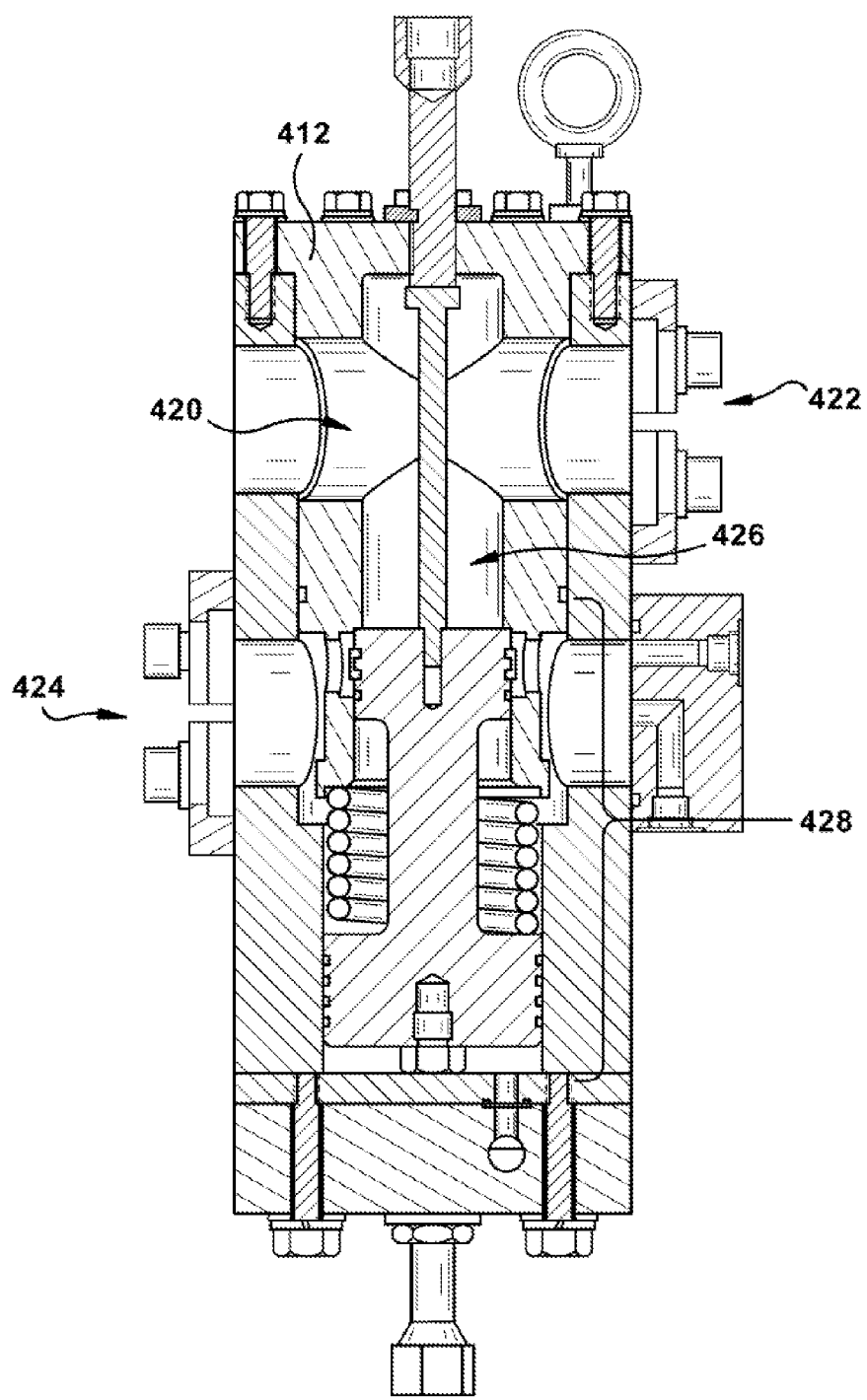
FIG. 10 depicts a cross-section of the exemplary trip manifold device along a line B-B of FIG. 8.

FIG. 5 illustrates a schematic diagram of an exemplary trip manifold device 300 for use as trip manifold devices 120, 220 in FIGS. 1, 2, 3, and 4. The trip manifold device 300 includes a pilot manifold 302 and a pilot manifold fluid circuit 304 with a number of conduits 306 to distribute fluid throughout the various components of the trip manifold device 300. The conduits 306 can include pipes and tubing or, in one example (details of which are shown in FIGS. 8, 9, and 10 below), construction integrates the conduits 306 into (and/or as part of) the material of the pilot manifold 302. The conduits 306 can couple with one or more manifold ports (e.g., a first pilot supply port 308, a second pilot supply port 310, and a trip header supply port 312). A drain port 314 allows fluid to exit the trip manifold device 300, e.g., during evacuation of the trip header to prevent damage from over-speed conditions at the turbo-machine.

As also shown in FIG. 5, the manifold fluid circuit 304 has one or more elements (e.g., a pilot element 316 and a drain valve element 318) that embody one exemplary arrangement for pilot element 230 and drain valve element 232 of FIGS. 2, 3, and 4. The pilot element 316 includes one or more pilot valves (e.g., a first pilot valve 320 and a second pilot valve 322). The drain valve element 318 has one or more drain valves (e.g., a drain valve 324), which have a body 326, an actuator 328, and a biasing element 330 (e.g., a coil spring). The body 326 also has a main inlet 332 and a main outlet 334 that couple with, respectively, the trip header supply port 312 and the drain port 314. The body 326 also has a pilot inlet 336 which couples with the second pilot supply port 310.

Exemplary devices for use as the pilot valves 320, 322 can include solenoid valves having various states including an energized state and a de-energized state. The solenoid valves can change between these states in response to an electrical impulse or signal. In one example, both of the pilot valves 320, 322 are in their energized state to prevent the flow of fluid through the pilot element 316 during normal running conditions of the turbo-machine. In response to the over-speed condition, however, both of the pilot valves 320, 322 change to their de-energized states to allow the flow of fluid through the pilot element 316. Because the pilot valves 320, 322 are de-energized to trip the turbo-machine, embodiments of the trip manifold device 300 are inherently "fail safe" in the event of disruption in control signals and/or power to the pilot valves 320, 322.

Examples of the drain valve 324 include poppet valves, wherein the actuator 328 translates within the body 326 between one or more positions. These positions may include a first position to prevent fluid flow through the first drain valve 324 and a second position to permit fluid to flow through the first drain valve 324. The biasing element 330 provides a force, typically a spring force, that causes the actuator 328 to reside in one of the first position or the second position. In one example, the spring force is offset by the hydraulic port 310 and places the actuator 328 in the first position during normal running conditions of the turbo-machine.

Figure 6:
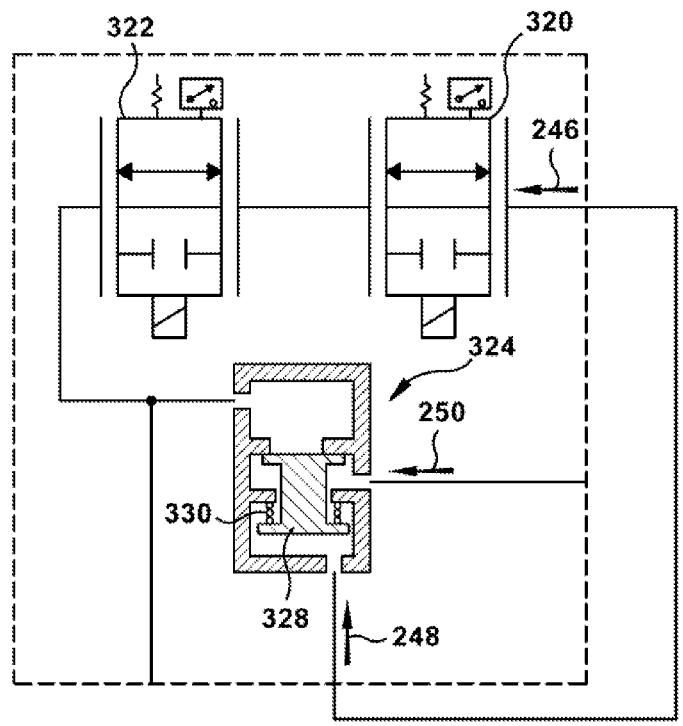
FIG. 6 depicts a flow pattern on the exemplary trip manifold device of FIG. 5 during normal operating conditions of a turbo-machine.
Figure 7:
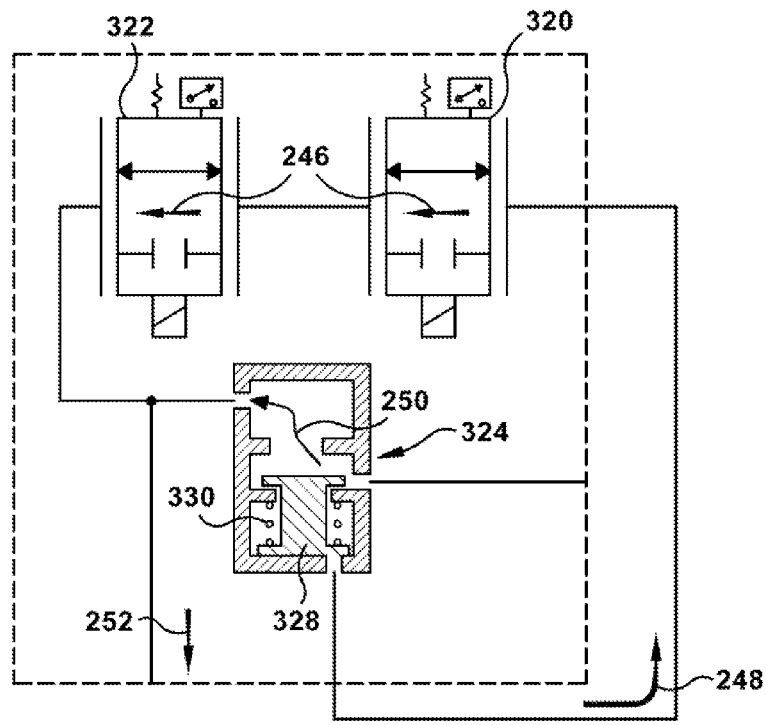
FIG. 7 depicts the flow pattern on the exemplary trip manifold device of FIG. 5 during an over-speed condition of the turbo-machine.

FIGS. 6 and 7 illustrate operation of the trip manifold device 300 with arrows to show the flow pattern that occurs to accommodate the various operating conditions for the turbo-machine. In FIG. 6, the pilot valves 320, 322 are in their energized state. Thus, the first pilot supply 246 cannot flow through the pilot valves 320, 322. This condition, in turn, builds pressure in the second pilot supply 248. The pressure overcomes the force of the biasing element 330 to maintain the actuator 328 in its first position, thereby effectively preventing the flow of the main supply 250 to drain.

FIG. 7 depicts the flow pattern that results when the pilot valves 320, 322 enter the de-energized state. In this example, the first pilot supply 246 flows through the pilot valves 320, 322, which rapidly reduces the pressure the second pilot supply 248 places on the actuator 328. The force of the biasing element 330 combined with the hydraulic force of the main supply 250 eventually overcomes the pressure of the second pilot supply 248, thereby forcing the actuator 328 to its second position and, ultimately, permitting the main supply 250 to flow through the drain valve 324 and out of the trip manifold device 300 as the drain supply 252.

The dual-valve arrangement for the pilot valves 320, 322 is beneficial for purposes of maintenance and testing of trip manifold device 300. For example, because in one implementation both of the pilot valves 320, 322 must be de-energized for fluid to flow through the drain valve 324, each of the pilot valves 320, 322 can be cycled individually and independently from one another without significantly changing the pressure of the second pilot supply 248. This feature also allows for single point failure of either one of the pilot valves 320, 322 without tripping the turbo-machine and, moreover, will annunciate the latent failure to the primary plant or turbo-machine controller 205.

FIG. 8 illustrates another exemplary trip manifold device 400 for protecting against damage from over-speed conditions that can occur on a turbo-machine. The trip manifold device 400 includes a pilot element 402 and a drain valve element 404 that operate together to dump fluid from a header to a drain. The pilot element 402 includes a pilot manifold 406 and a pair of solenoid valves (e.g., a first solenoid valve 408 and a second solenoid valve 410). The drain valve element 404 includes a drain housing 412 that receives the pilot housing 406 thereon.

As best shown in FIG. 9, which depicts a cross-section of the trip manifold device 400 taken along line A-A of FIG. 8, the pilot housing 406 incorporates a pilot circuit 414 that couples the first solenoid valve 408 and the second solenoid valve 410. The pilot circuit 414 includes various conduits 416 through which fluid can flow among and between the solenoid valves 408, 410 and among and between the pilot element 402 and the drain valve element 404. In one example, one or more pressure-generating elements 418 (e.g., fixed orifices) are in position in the conduits 416 to modify pressure of the fluid that flows through the pilot circuit 414. The elements 418 can also provide an air bleeder path to drain and indicate the state of the solenoid valves 408, 410.

FIG. 10 depicts a cross-section of the drain housing 412 taken along line B-B of FIG. 8. The drain housing 412 incorporates a drain circuit 420 with one or more inlet/outlets (e.g., a first inlet/outlet 422, a second inlet/outlet 424), and a central bore 426. A poppet valve 428 resides in the central bore 426. The poppet valve 428 can translate within the central bore 426 to prevent and/or permit fluid to flow through the drain housing 412 and, in one example, between the inlet/outlets 422, 424.

The drain housing 412 is configured to interface with conduits (e.g., conduits 114 of FIG. 1) that make-up the fluid circuit (e.g., fluid circuit 102 of FIG. 1) of the protection system. The interface can utilize pipe fittings and connectors to allow the trip manifold device 400 (FIG. 8) to be removable and replaceable from the protection system. In other examples, welds and/or SAE flanges secure the drain housing 412, integrating the trip manifold device 400 (FIG. 8) into the protection system as a unitary or monolithic structure. In one example, the first inlet/outlet 422 and the second inlet/outlet 424 can couple with, respectively, the drain and the main fluid header to receive the main supply.

In general, the pilot housing 406 and the drain housing 412 comprise materials, e.g., metals, plastics, composites, conducive to fabrication techniques to form the integrated conduits and flow paths discussed above. This material is also resistant to wear and, in some cases, is non-active with, or chemically inert to, the fluid that flows therein. Moreover, the disclosure contemplates the use of various fasteners (e.g., screws, bolts, adhesives) to secure together one or more elements of the trip manifold device 400.

Examples of the solenoid valves 408, 410 (FIG. 8) and the poppet valve 428 (FIG. 10) can comprise off-the-shelf devices (and components) that secure with corresponding features on the pilot housing 406. These devices and components are sized and configured with operating characteristics (e.g., response time, duty cycle, flow rate, materials, reliability, etc.) to handle the large and rapid flow required to expeditiously drain fluid from the header to trip operation of the turbo-machine.

In view of the foregoing, embodiments of the systems and devices discussed above address the problem of unwanted trips should a component (e.g., an external pilot or valve) become plugged or mistakenly closed at an inappropriate time during maintenance and testing activities. During normal operation with the external pilot functioning, there is very little to no flow through the internal pilot. However, if the external pilot source becomes plugged or shut off, the flow through the internal pilot orifice increases and serves as a backup internal supply to the pilot circuit. Using a vented trip header isolation ball valve in the hydraulic circuits helps to prevent unwanted dips in trip header pressure and potential unwanted turbine trips during return to service after maintenance.

In one embodiment, the dual-solenoid piloted poppet valve design can use the API 670 recommended 2-out-of-2 trip system arrangement. These embodiments, however, apply this arrangement to pilot a large poppet dump valve. This arrangement serves to increase drain flow capacity as compared to a direct acting poppet solenoid valve. The self-filling and pressurizing (pre-charging) of the trip header downstream of the isolation valve facilitates return to service after on-line maintenance or testing with negligible impact to the trip header pressure. This function is accomplished through the pilot circuit via the poppet fill orifice rather than through a dedicated external by-pass around the trip header isolation valve.

Technical advantages include features as discussed above to prevent unwanted turbine trips, increase dump flow volume, and facilitate on-line maintenance and isolation without additional external piping. Moreover, the technical features are incorporated into a single packaged system intended to provide improved running reliability for the customer. This feature may be important for application in petrochemical industry, where specification often require run times of 10 years or more without a turbine trip.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A protection system for over-speed protection in a turbo-machine, said system comprising:
    a fluid circuit comprising a header, a drain, and a hydraulic circuit coupling the header to the drain, the hydraulic circuit comprising a trip manifold device with a first state that prevents fluid to flow from a first inlet/outlet of the trip manifold device to a second inlet/outlet of the trip manifold device and a second state that permits fluid to flow from the first inlet outlet to the second inlet/outlet,
    wherein the second state places the header in flow connection with the drain to permit fluid in the header to flow to the drain, and
    wherein the hydraulic circuit comprises a first hydraulic circuit and a second hydraulic circuit that couple with the header to separate drains.

2. The system of claim 1, wherein the hydraulic circuit directs a supply fluid to the trip manifold device as a pilot supply and a main supply, and wherein the pilot supply pressurizes an actuator in the trip manifold device to maintain the trip manifold device in the first state.

3. The system of claim 2, further comprising one or more valves disposed in hydraulic circuit between the header and the trip manifold device.

4. The system of claim 1, further comprising a junction box coupled with the trip manifold device, wherein the junction box provides an interface between turbo-machine controls and elements in the trip manifold device to change the trip manifold device between the first state to the second state.

5. The system of claim 4, wherein the elements comprise a pair of solenoid valves.

* * * * *